United States Patent
Potter et al.

(10) Patent No.: US 6,624,300 B2
(45) Date of Patent: *Sep. 23, 2003

(54) METHOD FOR CONCENTRATING BETA-GLUCAN FILM

(75) Inventors: Richard C. Potter, Seeley Lake, MT (US); Philip A. Fisher, Florence, MT (US); Kirk R. Hash, Sr., Drummond, MT (US); John D. Neidt, St. Louis, MO (US)

(73) Assignee: Nurture, Inc., Missoula, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/921,846

(22) Filed: Aug. 2, 2001

(65) Prior Publication Data

US 2002/0016454 A1 Feb. 7, 2002

Related U.S. Application Data

(62) Division of application No. 09/252,356, filed on Feb. 17, 1999, now Pat. No. 6,323,338.

(51) Int. Cl.[7] .............................................. C08B 37/00
(52) U.S. Cl. ............................. 536/123.12; 536/123.1; 536/128; 424/443; 424/488
(58) Field of Search ...................... 536/123.12, 123.1, 536/128; 424/443, 488

(56) References Cited

U.S. PATENT DOCUMENTS

| | | |
|---|---|---|
| 4,028,468 A | 6/1977 | Hohner et al. |
| 4,233,438 A | 11/1980 | Myers et al. |
| 4,562,020 A | 12/1985 | Hijiya et al. |
| 4,769,363 A | 9/1988 | Misaki et al. |
| 4,804,545 A | 2/1989 | Goering et al. |
| 5,013,561 A | 5/1991 | Goering et al. |
| 5,024,996 A | 6/1991 | Ringe |
| 5,063,078 A | 11/1991 | Foehse |
| 5,106,640 A | 4/1992 | Lehtomaki et al. |
| 5,151,283 A | 9/1992 | Foehse et al. |
| 5,183,677 A | 2/1993 | Lehtomaki et al. |
| 5,223,491 A | 6/1993 | Donzis |
| 5,512,287 A | 4/1996 | Wang et al. |
| 5,518,710 A | 5/1996 | Bhatty |
| 5,576,015 A | 11/1996 | Donzis |
| 5,614,242 A | 3/1997 | Fox |
| 5,676,967 A | 10/1997 | Williams et al. |
| 5,725,901 A | 3/1998 | Fox |
| 5,811,542 A | 9/1998 | Jamas et al. |
| 6,323,338 B1 * | 11/2001 | Potter et al. ............ 536/123.12 |

FOREIGN PATENT DOCUMENTS

| | | |
|---|---|---|
| EP | 0 236 124 A2 | 9/1987 |
| EP | 0 251 798 A1 | 1/1988 |
| EP | 0 322 393 | 6/1989 |
| EP | 0 328 317 | 8/1989 |
| EP | 0 377 530 A2 | 7/1990 |
| EP | 0 449 557 A2 | 10/1991 |
| EP | 0 606 080 A1 | 7/1994 |
| WO | WO 96/31128 | 10/1996 |
| WO | WO 98/13056 | 4/1998 |
| WO | WO 98/50398 | 12/1998 |

OTHER PUBLICATIONS

Autio, et al., Flow Properties of Solutions of Oat B–Glucans, *Journal of Food Science* 52(5):1364–1366 (1987).

Autio, et al., Effects of Processing on the Microstructure of Oat (Avena Sative) Bran Concentrate and The Physicochemical Properties of Isolated β–Glucans, *Food Structure* 11:47–54 (1992).

Beer, et al., Extraction of Oat gum from Oat Bran: Effects of Process on Yield, Molecular Weight Distribution, Viscosity and (1→3)(1→4)–β–D–Glucan Content of the Gum, *Cereal Chemistry* 73(1):58–62 (1996).

Bhatty, R.S., Physiochemical and Functional (Breadmaking) Properties of Hull–less Barley Fractions, *Cereal Chem.* 63(1):31–35 (1986).

Tvaroska, et al., Crystalline conformation and structure of lichenan and barley β–glucan, *Can. J. Chem.* 61:1608–1616 (1983).

Westerlund, et al., Isolation and chemical characterization of water–soluble mixed–linked β–glucans and arabinoxylans in oat milling fractions, *Carbohydrate Polymers* 20:115.123 (1993).

Wood, et al., Large–Scale Preparation and Properties of Oat Fraction Enriched in (1→3)(1→4)–βD–Glucan, *Cereal Chem.* 66(2):97–103 (1989).

Wood, et al., Molecular Characterization of Cereal β–D–Glucan and Rapid Structural Evaluation of β–D–Glucans from Different Sources by High–Performance Liquid Chromatography of Oligosaccharides Released by Lichenase, *Cereal Chem.* 68(1):31–39 (1991).

*Cereal Foods World*, AACC 77th Annual Meeting abstract (1992).

* cited by examiner

*Primary Examiner*—Francisco Prats
(74) *Attorney, Agent, or Firm*—Knobbe Martens Olson & Bear LLP

(57) ABSTRACT

An entirely aqueous method for concentrating beta-glucan from a beta-glucan source, such as milled cereal bran, grain or distiller's dried grain. The method comprises providing an alkaline aqueous extract of a beta-glucan source; acidifying or neutralizing the extract and heating the extract to between about 60° C. and 100° C.; cooling the extract, whereby a flocculate is formed; acidifying the cooled extract if the extract was neutralized; and removing the flocculate from the aqueous solution to form an intermediate solution. The intermediate solution may be subjected to ultrafiltration for further purification of beta-glucan, or may be evaporated, resulting in formation of a solid film enriched in beta-glucan. Beta-glucan has cholesterol-lowering properties and is a topical immunostimulant.

7 Claims, 2 Drawing Sheets

METHOD FOR CONCENTRATING BETA-GLUCAN FILM

RELATED APPLICATIONS

This applications is a divisional of application Ser. No. 09/252,356, filed on Feb. 17, 1999 now U.S. Pat. No. 6,323,338.

FIELD OF THE INVENTION

The present invention relates to a method for isolating and concentrating mixed-linkage beta-glucans from a beta-glucan source, such as cereal bran or grain, particularly oats and barley. The disclosed process is entirely aqueous and results in efficient production of beta-glucan concentrates. This is a divisional application of U.S. application Ser. No. 09/252,356 filed on Feb. 17, 1999.

BACKGROUND OF THE INVENTION

Mixed-linkage $(1\rightarrow 3)$, $(1\rightarrow 4)$ beta-D-glucans, referred to herein as beta-glucan, are the predominant cell wall components of grain endosperm, particularly oats and barley, and are a well-established antihypercholesterolemic agent. In the case of beta-glucan found naturally in oats, this effect has been acknowledged by the U.S. Food and Drug Administration (FDA). Beta-glucan also has immunostimulatory properties when applied topically to the skin. The biochemical mechanisms by which beta-glucan exerts its therapeutic effects are largely unknown.

Cereal grain seeds generally contain a small amount of beta-glucan, with oats and barley being recognized as the richest sources of this material. The naked oat seed, known in the art as a "groat", typically contains from 2–4% by weight beta-glucan, depending upon oat variety and other factors such as growing conditions. Barley seeds may typically contain twice as much beta-glucan as groats. Beta-glucan is generally found in higher concentrations in the outermost layers of the seed (i.e., the "bran"). Thus, oat bran is defined as containing a minimum of 5.5% by weight beta-glucan, and typically contains up to 6% or 7% by weight beta-glucan.

In order to receive an efficacious amount of beta-glucan for reduction of low density lipoprotein (LDL) and total serum cholesterol, the FDA recommends total beta-glucan ingestion of at least 3 grams daily. However, it is difficult and inconvenient for the average individual to obtain this recommended amount because of the inherently low beta-glucan content in products such as oatmeal, oat bran muffins or cooked barley. For example, in the case of oatmeal, which is simply rolled whole oats, one would have to consume up to 150 grams (dry basis) each day, an amount which most individuals would find extremely burdensome. Accordingly, there is a compelling need to provide a more concentrated form of beta-glucan so that consumers can conveniently ingest therapeutic amounts of this material.

Previous processes for concentrating beta-glucan from cereals such as oats or barley have proven impractical for commercial manufacturing processes because of high cost and/or low yields. The prohibitive cost associated with processes disclosed in the literature is almost always a consequence of reliance upon a precipitation step in which beta-glucan is removed from aqueous solution by an organic solvent, especially alcohols such as ethanol or isopropanol, the use of which entails high in-process losses and difficult reclamation. This is evidenced in the marketplace wherein beta-glucan concentrates are only sold as cosmetic ingredients, with prices typically greater than $100 per pound. There is presently no concentrated form of beta-glucan priced so as to be affordable for use as a dietary supplement or food additive. The most concentrated form of commercially available beta-glucan for nutritional purposes contains just 15% beta-glucan (Nurtur® 1500, supplied by Nurture, Inc., Missoula, Mont.).

U.S. Pat. No. 5,518,710 to Bhatty discloses alkaline extraction of barley and oat bran, addition of an amylolytic agent to degrade starches, followed by precipitation of beta-glucan with a polar alcohol. Beer et al. (*Cereal Chemistry* 73:58–62, 1996) disclose a process for isolating beta-glucan in which oat bran concentrates are extracted in aqueous solution at alkaline pH, followed by dialysis, ultrafiltration or alcoholic precipitation. The material resulting from these processes had a beta-glucan content of about 60–65%. Westerlund et al. (*Carbohydrate Polymers,* 20:115–123, 1993) disclose a procedure for isolation of beta-glucan involving lipid extraction, enzymatic removal of starch and protein, and subsequent ethanol precipitation. EP 0 377 530 A2 discloses a process for the preparation of a beta-glucan-enriched grain for use as a food or food additive, in which oats are slurried in cold water, followed by rapid homogenization and screening of the slurry. U.S. Pat. No. 5,013,561 to Goering et al. discloses a process for recovery of various products, including beta-glucan, from barley. In this process, barley is milled, mixed with water, heated and centrifuged to remove insoluble material. The supernatant is then heated, and centrifuged to remove insoluble material, and the supernatant is subjected to ultrafiltration to remove soluble sugars and to concentrate beta-glucan solids.

There is a need for an entirely aqueous process for concentrating beta-glucan which is efficient, economical and produces highly palatable beta-glucan concentrates for use in foods and pharmaceutical formulations. The present invention addresses this need.

SUMMARY OF THE INVENTION

One embodiment of the present invention is a method for concentrating beta-glucan from a beta-glucan source, comprising the steps of: (a) providing an alkaline aqueous extract of the beta-glucan source; (b) acidifying or neutralizing the extract and heating the extract to between about 60° C. and 100° C.; (c) cooling the extract, whereby a flocculate is formed; (d) acidifying the cooled extract if the extract was neutralized in step (b); and (e) removing the flocculate from the extract to form an intermediate solution. Preferably, the beta-glucan source is cereal grain, cereal bran, milled cereal grain, milled cereal bran or distiller's dried grain (DDG). Advantageously, the cereal is oats or barley.

In one aspect of this preferred embodiment, the aqueous alkaline extract has a pH of between about 7.5 and 12. Preferably, the aqueous alkaline extract has a pH of about 10. In another aspect of this preferred embodiment, the cereal grain is extracted at a temperature of between about 25° C. and 80° C. Advantageously, the extract of step (c) is cooled to between about 25 and 45° C. In one aspect of this preferred embodiment, the flocculate is removed by centrifugation. In addition, an amylolytic enzyme may be added during step (b). The method may further comprise subjecting the intermediate solution to ultrafiltration. Preferably, the intermediate solution is heated prior to ultrafiltration. In one aspect of this preferred embodiment, the intermediate solution is subjected to diafiltration prior to the ultrafiltration step. In another aspect of this preferred embodiment, the intermediate solution is treated with activated carbon or ion exchange media. The method may further comprise the step of drying the intermediate solution. Preferably, the drying step is performed in a double drum dryer or spray dryer. The method may further comprise the step of heating the intermediate solution to allow evaporation therefrom, whereby a solid film or skin, enriched in beta-glucan, is formed on the surface of the solution. In addition, the method may further comprise the step of removing the beta-glucan film, resulting in formation of a second beta-glucan film. Preferably, the beta-glucan film removing step is performed one or more times. The method may further comprise drying the beta-glucan film. Another aspect of this preferred embodiment further comprises the step of subjecting the intermediate solution to ultrafiltration after removal of the beta-glucan film. Preferably, the ultrafiltration step removes salts and other contaminants from the intermediate solution.

Another embodiment of the present invention is substantially concentrated beta-glucan produced by the methods described above.

The present invention also provides an isolated beta-glucan enriched solid film or concentrate produced by the methods described above.

The present invention also provides a composition comprising beta-glucan produced by any of the methods described above, in combination with a food product.

The present invention also provides a pharmaceutical composition comprising beta-glucan produced by any of the methods described above, and a pharmaceutically acceptable carrier.

In addition, the present invention provides a cosmetic composition comprising beta-glucan produced by any of the methods described above.

Another embodiment of the present invention is an isolated beta-glucan-enriched film formed by evaporating a beta-glucan-containing solution until surface film formation occurs. The beta-glucan-enriched film may be provided in combination with a food product. The beta-glucan-enriched film may also be provided as a pharmaceutical composition in combination with a pharmaceutically acceptable carrier. The beta-glucan may also be provided as a cosmetic composition.

The present invention also provides a method for preparing concentrated beta-glucan by evaporating water from an aqueous beta-glucan-containing solution, and allowing a solid film of concentrated beta-glucan to form on the surface of the solution.

DETAILED DESCRIPTION OF THE PREFERRED EMBODIMENT

The present invention provides an improved, totally aqueous process for concentration of beta-glucan from any beta-glucan-containing source including, but not limited to, cereal grains and brans, particularly oats and barley. Typically, the cereal grains and brans are milled prior to concentration of beta-glucan. The term "cereal" includes (but is not limited to) any of the various cultivars of oat, barley, wheat, rye, corn, rice, sorghum, millet and amaranth. The term "beta-glucan" is defined as a glucan with a mixed $\beta(1\rightarrow3),(1\rightarrow4)$ linked glucopyranosyl backbone.

The present method can also be used to produce beta-glucan concentrates from distiller's dried grain (DDG), also known as spent brewer's grain, which is the spent, dried grains recovered after alcohol fermentation of cereals, particularly wheat, corn and barley. DDG is largely a waste material with few commercial uses.

The process described herein for concentrating beta-glucan is completely aqueous, and does not require any organic or toxic solvents, thus enabling production of concentrated beta-glucan at a manufacturing cost sufficiently low to enable sale of the product for nutritional applications. The resulting beta-glucan retains a high molecular weight, between about 400,000 and one million daltons, which is believed to be essential for its cholesterol lowering ability.

Various parameters of the present beta-glucan concentration method can also be adjusted to vary the final beta-glucan concentration from about 30% weight to more than 90% weight. In a preferred embodiment, the concentration of beta-glucan produced by the present method is between about 30% weight and about 100% weight. In a more preferred embodiment, the concentration is between about 50% and about 95%. In a most preferred embodiment, the concentration is between about 60% and about 90%. The resulting beta-glucan concentrate is entirely water soluble, thereby facilitating its use in a variety of dosage forms.

The present method is scalable and, accordingly, process equipment can be sized sufficiently large so as to maximize economies of scale. The method also generates several co-product streams rich in starch, proteins and lipids which are valuable in nutritional and personal care applications. The resulting beta-glucan is also useful as a cosmetic ingredient.

Figure 1:
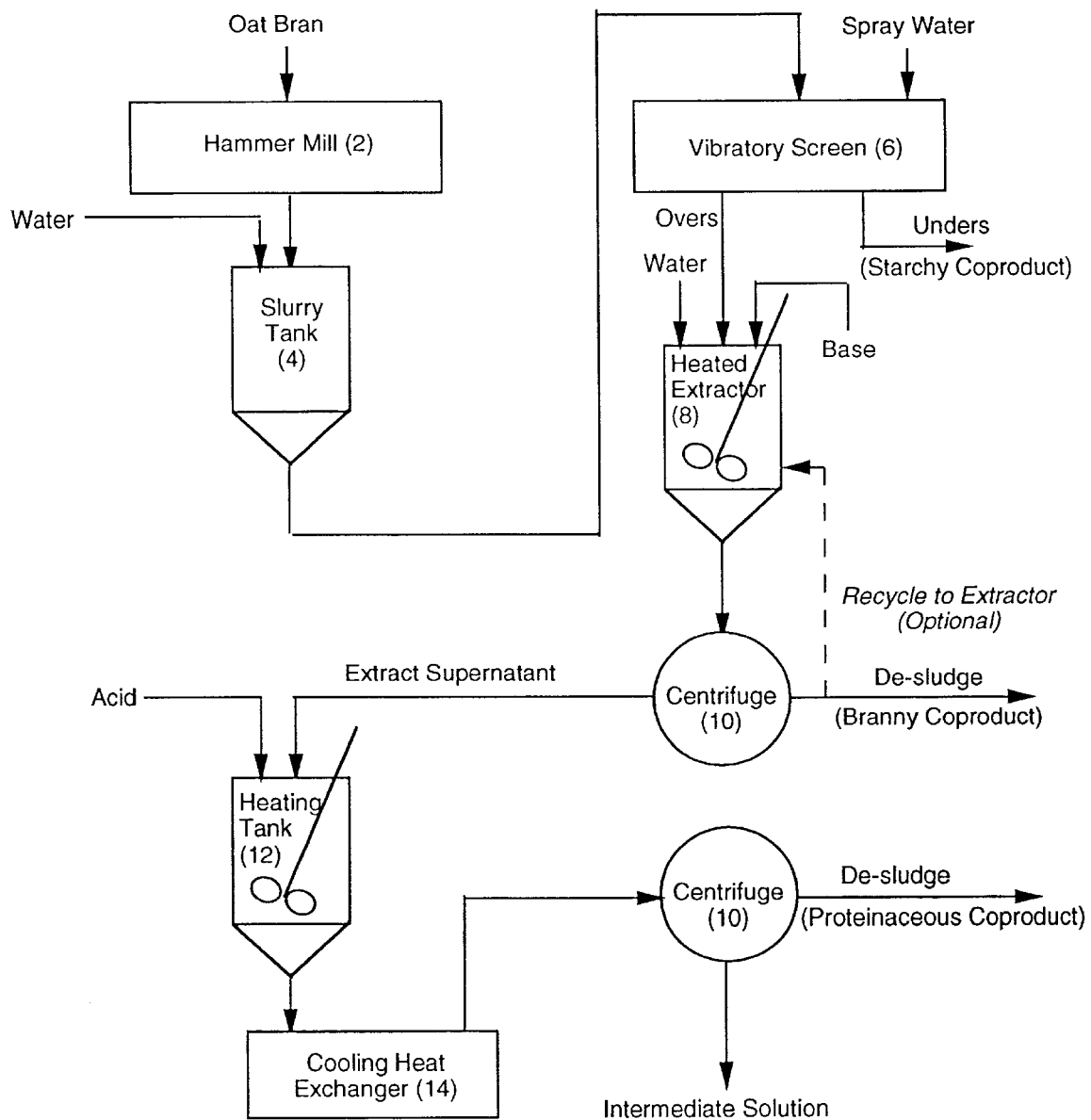
FIG. 1 is a diagram summarizing the production of beta-glucan-enriched intermediate solution. Oat bran is milled, slurried and passed over a screen to remove starch. The material unable to pass through the screen is extracted under alkaline conditions and centrifuged. The supernatant is acidified, heated, cooled and centrifuged to remove proteins. The resulting supernatant is called the intermediate solution. It should be noted that oat bran is only one exemplary source of beta-glucan.
Figure 2:
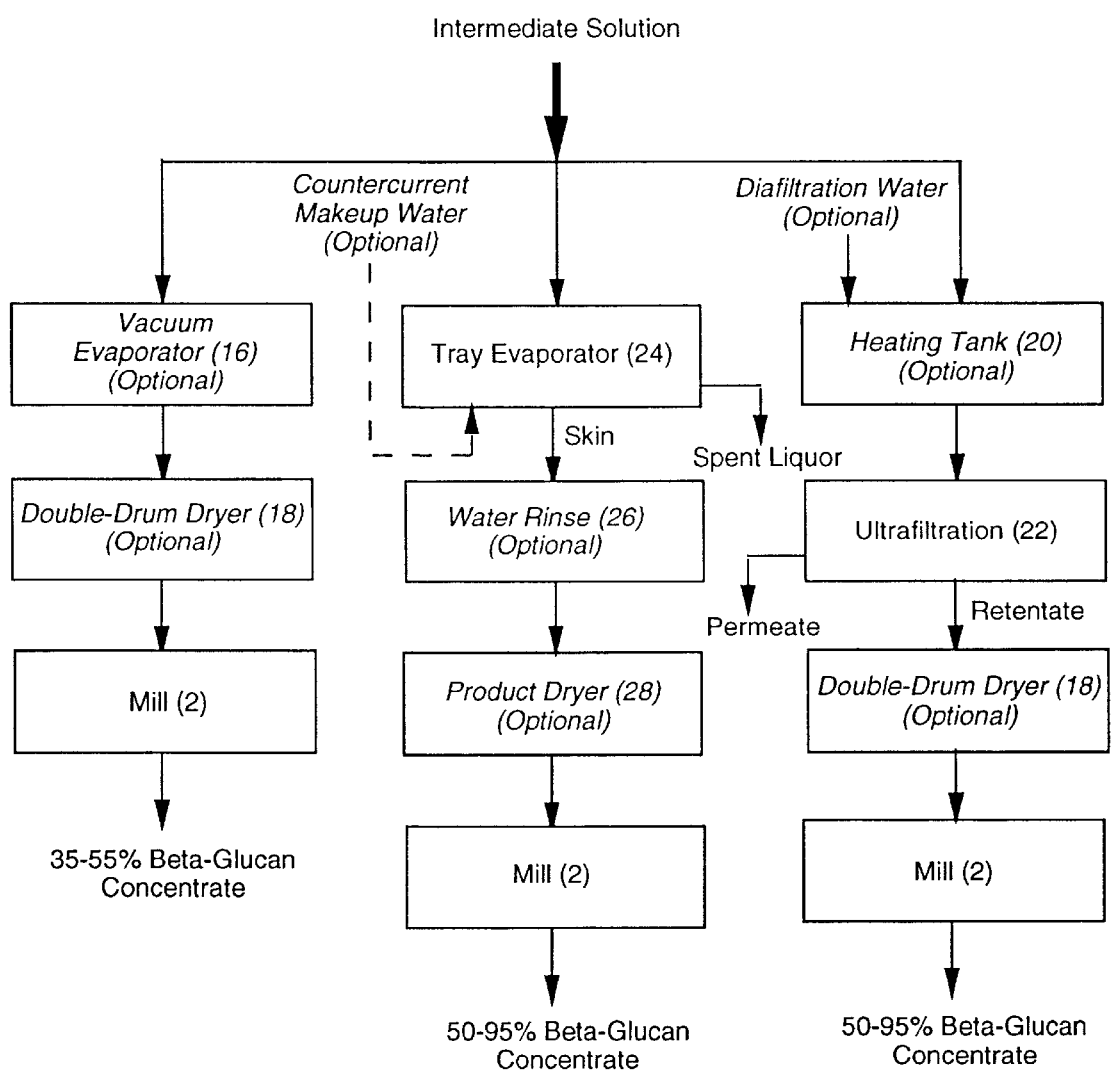
FIG. 2 is a diagram showing three processing pathways for the intermediate solution produced as shown in FIG. 1. The intermediate solution is dried and milled to form a 35%–55% beta-glucan concentrate (left pathway), evaporated to produce a skin enriched in beta-glucan, which is dried and milled to form a 50–95% beta-glucan concentrate (center pathway) or subjected to ultrafiltration, dried and milled to produce a 50–95% beta-glucan concentrate (right pathway). It should be noted that the drying step in each pathway is optional.

The beta-glucan concentration method of the present invention is illustrated in the diagrams shown in FIGS. 1 and 2. Referring to FIG. 1, oat bran, or any other desired cereal grain bran, is ground or milled, i.e., size reduced, using hammer mill 2 to form a bran flour. The oat bran may also be milled in any other conventional manner known in the grain milling art (e.g., pin milling). Optionally, the whole grain may be inactivated prior to or after milling to minimize glucanase activity, such as by heating to about 100° C. Whole grains, cereal flours, brans and commercially available breakfast cereals can also be used as starting materials in the process of the present invention. Cereal flours and brans are commercially available from a number of sources or can be produced from a desired cereal using standard milling techniques such as described in Bhatty, *Cereal Chem.* 63:31–35, 1986; Wood et al., *Cereal Chem.* 66:97–103, 1989; and Wood et al., *Cereal Chem.* 68:31–39, 1991, and are well known to those of skill in the art.

The milled bran is then slurried with an aqueous solution, preferably cold water, in a slurry tank 4, or other suitable vessel, and pumped over a screen or filter, such as a USS 100 vibratory screen (149 μm opening) 6, to remove starch, although vibratory screens with USS mesh sizes between about 35 and 400 are suitable for use in the present invention. The fine starch granules ("unders"), typically less than 20 microns in size, pass through the screen, forming a starchy coproduct, while the milled bran ("overs") is much more coarse and does not pass through the screen. Other wet or dry methods for removing starch and/or other undesirable components are also contemplated, including air classification, differential density or electrostatic techniques. The material which does not pass through the screen is extracted under alkaline conditions in a heated extractor 8, or other suitable vessel in order to dissolve beta-glucan. The alkaline extraction is preferably performed at a pH between about 7.5 and 12, more preferably between about 9 and 11, and most preferably at a pH of about 10. Although the use of sodium carbonate for beta-glucan extraction is described herein, any organic or inorganic base is suitable for use in the present invention, including, but not limited to, sodium hydroxide, potassium hydroxide, sodium bicarbonate, ammonia and the like. The alkaline extraction is generally performed at a temperature of between about 40° C. and 80° C., more preferably between about 50° C. and 70° C. and most preferably between about 55° C. and 65° C. for between about 0.5 hour and 3 hours, preferably about 1 or 2 hours.

Undissolved solids, including starch, insoluble fiber and other insoluble constituents of the spent bran, are removed by centrifuge 10, although the use of other conventional separation techniques including dialysis, filtration and passage through a mesh or cloth are also contemplated. This results in formation of a supernatant and a branny coproduct. Optionally, this branny coproduct may be recycled to the heated extractor 8 for one or more extractions, followed by removal of undissolved solids. The supernatant (or combined supernatants) is then either acidified to a pH of between about 2 and 6, preferably about 4 (to induce isoelectric precipitation of proteins), with an organic or inorganic acid (e.g., hydrochloric, acetic, phosphoric, citric and the like), or neutralized with an organic or inorganic acid to a pH of between about 6 and 8, preferably about 7, and heated to or near the boiling point (between about 60° C. and 100° C., preferably between about 80° C. and 90° C.) for between about 15 minutes and 1 hour, preferably 30 minutes, in a heating tank 12 or other suitable vessel in order to eliminate bacteria and neutralize any residual glucanase activity. Heating of the supernatant to or near the boiling point promotes the subsequent precipitation of various solids, including proteins, in the cooling step described below. An amylolytic enzyme such as α-amylase (e.g., Termamyl) may optionally be added during this step in order to eliminate, in whole or in part, contaminating starches. The solution is then cooled to between about 25° C. and 45° C., preferably to about 30° C., resulting in formation of a heavy flocculate most likely comprising primarily protein and starch (proteinaceous coproduct). It should be noted that the flocculate generally forms upon commencement of the cooling process, except in the case where the solution has been neutralized rather than acidified as described above, in which case the flocculate may form either prior to or after acidification in the cooling step. The cooling step is typically performed in a heat exchanger 14, although other methods including placing the solution in a water bath or allowing the solution to cool by itself are also within the scope of the invention. If the supernatant was neutralized prior to heating to near the boiling point, the resulting material is acidified to a pH of between about 2 and 6, preferably about 4, after the cooling step.

The flocculate is then removed, preferably by centrifuge 10, although the other solid removal methods listed above can also be used. The resulting solution may be optionally refined by conventional treatment with activated carbon or ion exchange media.

The resulting solution, referred to as the "intermediate" solution, contains between about 0.1% and 3.0%, preferably between about 0.5% and 1.0% weight dissolved solids, comprising beta-glucan, starch, protein and salts resulting from prior acid/base additions. The intermediate solution may be dried using conventional drying equipment such as a vacuum evaporator 16 and double-drum dryer 18, or a spray dryer (FIG. 2). The beta-glucan content of the dried product is typically between about 35 and 55% weight, and may range from about 25–55% weight. The dried product is then milled using mill 2. The product also contains a significant amount of salt, and is thus useful for dietary products in which it replaces added salt. However, in other preferred embodiments, the majority of salt and other low molecular weight contaminants are removed, thereby increasing the beta-glucan concentration and improving palatability and versatility.

As described in Example 6 below, the step in which the supernatant is heated to near the boiling point, after either acidification or neutralization, unexpectedly results in significantly more beta-glucan in the supernatant after cooling and removal of the resulting flocculate than does the conventional step disclosed in the literature, in which the supernatant is cooled to ambient temperature, followed by acidification to pH 4 and subsequent removal of precipitated solids by centrifugation. This conventional step typically precedes beta-glucan precipitation in alcohol in prior art processes.

In a preferred embodiment of the present invention, the intermediate solution is placed in ultrafiltration unit 22 for further concentration of beta-glucan using a membrane with an appropriate pore size to retain beta-glucan (FIG. 2). Membranes suitable for use in the ultrafiltration step have pore sizes ranging from between about 200 angstroms and 5 μm, preferably about 0.2 μm. This method is used for dewatering purposes because it can be more cost-effective than traditional thermal drying techniques. In the present method, ultrafiltration using well known crossflow ceramic filters, polymer filters, and the like is used for conventional dewatering and for removal of low molecular weight contaminants, such as sodium chloride, from the intermediate solution. Optionally, the solution may be heated in a container including, but not limited to, heating tank 20 to between about 80° C. and 95° C., preferably about 90° C., and/or fresh water may be added (i.e., diafiltration) prior to ultrafiltration in order to increase filtration efficiency (i.e., reduced viscosity and fouling). The ultrafiltered solution (retentate), when dried by conventional means (i.e., double drum dryer 18), yields a concentrate typically containing between about 60% and 70% weight beta-glucan; however, higher beta-glucan concentrations, preferably 75%, 80%, 85%, 90% or 95%, can be obtained by repeated rounds of ultrafiltration or by routine optimization of process conditions. Overall beta-glucan recovery, on the basis of the beta-glucan initially contained in the starting raw material, is as high as about 70%. The dried material is then milled using mill 2.

Unexpectedly, when the intermediate solution was heated in one or more open vessel(s) such as tray evaporator 24, or any other suitable open vessel such as a bowl, vat or beaker, a thin, solid film, or "skin", spontaneously formed on the surface of the liquid, and generally covered the entire surface (FIG. 2). This surface skin, which was clear and translucent in appearance, comprised predominantly beta-glucan and separated out from a very dilute beta-glucan solution. It is not essential that the vessel be open during skin formation. Any atmosphere above the vessel that permits sufficient skin formation can be used. In addition, the evaporation step may be performed under continuous countercurrent flow utilizing fresh water or other aqueous solutions.

Without wishing to be bound by any particular theory, it is believed that the formation of the beta-glucan skin is due to either highly localized saturation or supersaturation of beta-glucan in solution resulting from evaporation, leading to the rapid crystallization or precipitation of beta-glucan. It appears that both heating and evaporation are required for skin formation. The evaporation may provide a cooling effect, thereby promoting formation of the film at the surface, or may simply provide a removal mechanism for newly unbound water. After removal of the beta-glucan skin from the surface of the solution, and upon further heating and evaporation of the solution, a second beta-glucan skin is formed and removed. This process can be repeated one or more times to isolate additional beta-glucan skin. This multiple skin formation is described in Examples 2, 5 and 8.

The term "self-assembly" has been adopted to describe the mechanism by which beta-glucan skin formation may occur. It is believed that a homogeneous beta-glucan solution of virtually any concentration can be made inhomogeneous by appropriate heating and attendant evaporation. Thermal convection currents are believed to convey the beta-glucan molecules to the liquid surface. There appears to be a driving force for these molecules to decrease the entropy of the system by congregating at the surface. This driving force may arise from surface tension effects and/or initiation of hydrogen bonding sufficient to herd the molecules together.

Formation of a viscous layer at the surface just prior to skin formation was also observed, which is in accord with the mechanism described above. This layer appears to be one or two millimeters thick. This layer has been harvested and found to contain 34.0% w beta-glucan (0.97% w solids), whereas the homogeneous parent material contained only 27.3% w beta-glucan (0.70% w solids). It is not unlikely that there is a pronounced concentration gradient within the viscous layer wherein highly concentrated beta-glucan is found in the uppermost (i.e., closest to the surface) molecular layers.

Thermal energy being applied to the solution may promote the displacement of bound water molecules and allow closer mutual approach of beta-glucan molecules. The proximity of an air-water interface facilitates removal of the newly unbound water. At some critical point, the beta-glucan molecules may approach closely enough to allow hydrogen bonding, and the beta-glucan then is believed to self-assemble into its preferred, planar conformation. This conformation is discussed in an x-ray diffraction study by Tvaroska et al. (*Can. J. Chem.* 61:1608–1616, 1983). Effectively, the beta-glucan becomes insoluble at this point and forms a solid phase having a density less than water, causing it to float. It should be noted that self-assembly of the beta-glucan molecules into planar form may actually be initiated well below the liquid surface and may be thermally driven; the partially assembled molecules may be less dense than water, further facilitating their rise to the surface. The solid phase can only be re-dissolved by application of sufficient energy for re-insertion (and re-binding) of water between beta-glucan molecules. It is also believed that relatively quiescent conditions are necessary for the solid planar phase to form, or, at least, to be readily visible. In fact, this aspect of the invention has probably deterred discovery by others, given the vigorous agitation normally associated with processes for beta-glucan recovery.

This beta-glucan skin may be rinsed with water one or more times (26), and dried in product dryer 28 to form a beta-glucan concentrate. If desired, the product may also be milled in mill 2. Thus, film formation provides another commercially viable basis for further processing of the intermediate solution. Although the beta-glucan surface skin was first observed in an unstirred surge tank containing intermediate solution which had been ultrafiltered, it was also found that the unfiltered intermediate solution would form a surface skin. The surface skin has also been induced using extract supernatant.

In addition, skin formation was also observed after slurrying oat bran in water for one hour and heating the resulting suspension in an open container to allow evaporation. This skin contained 17.6% beta-glucan. Although the beta-glucan concentration was diluted by the presence of random floating (brownish) masses of branny material, this represents a significant enrichment. In addition, the viscous thin layer prior to film formation was found to contain 9.6% beta-glucan. Thus, any beta-glucan-containing solution can be used for skin formation if allowed to evaporate.

The film can be readily harvested by various skimming or filtering techniques. Significantly, with continued heating, the film is rapidly regenerated on the surface. In this way, a significant quantity of beta-glucan in a substantially concentrated form can be isolated by successive harvests of film. It is advantageous to employ an evaporation vessel with a high surface area to volume ratio for this purpose. Overall beta-glucan recovery of at least 50% can be achieved using the film formation method. Beta-glucan concentrations of between about 60 and 85% weight in the dried film are routinely obtained. Further concentration increases, up to about 95% weight, may be obtained by minimal water washing of the film subsequent to harvest in order to remove excess dissolved contaminants. One particular advantage of the harvested film is that most of the salts and other dissolved contaminants remain in the heated solution. Moreover, the harvested film can be readily dried with conventional equipment and with minimal energy because the film is already substantially dewatered.

Optionally, for purposes of optimizing beta-glucan recovery, fresh water may be added to the beta-glucan-depleted, increasingly briny solution. This can be done in, for example, a standard countercurrent flow arrangement, involving one or more evaporation vessels, so as to achieve steady-state film regeneration and recovery, which is particularly useful for continuous flow production. The remaining solution can be further refined to recover and concentrate additional beta-glucan by sending it through an ultrafiltration unit as described above, thereby constituting a hybrid process.

The concentration techniques described above may be configured to run on either a batchwise basis or a continuous flow basis. Continuous flow is preferred because of the economies inherent in a continuous operating mode. These techniques can also be applied to any other sources of beta-glucan with minor modifications.

The beta-glucan produced by the methods of the present invention is useful in lowering serum cholesterol levels, and can be incorporated into pharmaceutical formulations, cosmetic formulations, or combined with food products. Because the beta-glucan produced by the present method is highly palatable, it can be added to a variety of foods including dairy products, dips, spreads, powdered drink mixes, margarine, packaged mixes, confections, health bars, soups, dressings, and the like. It can also be incorporated into pharmaceutically acceptable excipients or diluents, and into pharmaceutical formulations including tablets, capsules, elixirs, syrups, lozenges and the like. Beta-glucan-containing cosmetic formulations include skin lotions, soaps, shampoos, hair conditioners, skin creams and the like.

For oral administration, the beta-glucan may be incorporated into a tablet, aqueous or oil suspension, dispersible powder or granule, microbead, emulsion, hard or soft capsule, syrup or elixir. Compositions may be prepared according to any method known in the art for the manufacture of pharmaceutically acceptable compositions, such as those described in *Remington's Pharmaceutical Sciences*, 15th edition, Mack Publishing Co., Easton, Pa., 1985. These compositions may contain one or more of the following agents: sweeteners, flavoring agents, coloring agents and preservatives. Tablets containing the active ingredients in admixture with non-toxic pharmaceutically acceptable excipients suitable for tablet manufacture are acceptable. "Pharmaceutically acceptable" means that the agent should be acceptable in the sense of being compatible with the other ingredients of the formulation (as well as non-injurious to the individual). Such excipients include inert diluents such as calcium carbonate, sodium carbonate, lactose, calcium phosphate or sodium phosphate; granulating and disintegrating agents, such as corn starch and alginic acid; binding agents such as starch, gelatin or acacia; and lubricating agents such as magnesium stearate, stearic acid or talc. Tablets may be uncoated or may be coated with known techniques to delay disintegration and absorption in the gastrointestinal tract and thereby provide a sustained action over a longer period of time. For example, a time delay material such as glyceryl monostearate or glyceryl stearate alone or with a wax may be employed.

The beta-glucan prepared by the methods of the present invention may also be incorporated into topical formulations for use as an immunostimulant. Such topical formulations include creams, ointments, gels, salves, pastes, lotions, suspensions, emulsions and dispersions.

When wet or dissolved, the beta-glucan or beta-glucan-containing solutions of the present invention feel oily and have a mouthfeel similar to that of fatty foods. It is therefore contemplated that these compositions can be used as fat substitutes.

The following examples describing the beta-glucan concentration method of the present invention are meant to be construed as illustrative rather than limiting.

EXAMPLE 1

Preparation of Beta-glucan-containing Intermediate Solution

Commercial oat bran (Con Agra SCM-350) was fed into an Ajax 17D hammer mill fitted with a 2.5/64-inch screen. The resultant flour (50 lb) was added at a rate of 1.5 lb/min to a 20-gallon stainless steel tank where it was slurried with 15° C. water to approximately 10% w solids concentration. The flour/water slurry was pumped to a vibratory screen (Rotex Model 3431, 40×84") fitted with an overhead cold water spray bar and a USS 100 screen (149 µm openings).

The oversized material from the screen was gravity-fed to a 230-gallon stainless steel, jacketed extractor fitted with a propeller agitator. Sufficient water was added to result in 100-gallons of mixture. Temperature was maintained at 60° C. and pH was maintained at 10 by addition of 20% w sodium carbonate solution. The mixture was extracted under these conditions for two hours. Extraction mass exiting the vessel was pumped to a decanter centrifuge (Bird HP200) in order to remove solids. Supernatant fluid from the centrifuge was discharged to another 230-gallon stainless steel jacketed vessel equipped with propeller agitation. Temperature in this vessel was maintained at 80° C. and pH was maintained at 4 by addition of 20% HCl. The supernatant was held under these conditions for 15 minutes. Material exiting the vessel was conveyed through the shell side of a stainless steel shell-and-tube heat exchanger and was thereby cooled to less than 30° C. The cooled fluid was fed to a disk centrifuge (Westfalia SAMN 5036) in order to remove precipitated solids. The fluid exiting from the centrifuge was called "intermediate solution" and contained 0.72% w solids. These solids contained 42.9% w beta-glucan as determined using the modified McCleary method which is a standard assay for mixed linkage (1→3),(1→4) beta-glucan. This is a dual enzyme technique which reduces macromolecular beta-glucan to glucose. The glucose is reacted to form a chromophore which is subsequently quantitated by spectrophotometry. It is a codified method of the American Association of Cereal Chemists (AACC Method 32–33). This method was used to determine beta-glucan content in all of the examples provided below.

EXAMPLE 2

Formation and Harvesting of Beta-glucan "Sikin"

Intermediate solution prepared in accordance with Example 1 was placed in a steam-heated stainless steel tray having a relatively large surface area to volume ratio (23" wide×48" long×7.25" deep). The intermediate solution was maintained at a temperature of 87° C. The tray was initially filled with solution to a depth of 3 inches. Once the solution reached temperature, surface beta-glucan skins could be harvested about every 15 minutes. More than two dozen skins were sequentially harvested. Samples of three randomly selected skins were taken and oven-dried. They were found to contain beta-glucan in the following concentrations: 65.5% w, 73.6% w and 65.5% w. After the final skin was harvested, the depth of the remaining solution was 1.25 inches. This remaining solution contained 28.7% w beta-glucan and would have been capable of generating additional beta-glucan surface skins if so desired. All of the skins were combined and dried on a laboratory double-drum dryer (3" diameter×5" length). The beta-glucan concentration was 67.5% w.

EXAMPLE 3

Drying of Intermediate Solution

Three successive intermediate solution runs were performed according to Example 1. The intermediate solutions from these runs was evaporated under vacuum until about 75% of the water was lost. The vessel employed for this purpose was constructed of stainless steel and operated at 21 inches of vacuum and 99° C. The combined, concentrated solution was drum dried using a Blaw-Knox double-drum drier with chrome-plated rolls 4 feet in diameter and 10 feet in length. The dried material contained 45.9% w beta-glucan.

EXAMPLE 4

Continuous Flow Ultrafiltration Process

Commercial oat bran (Con Agra SCM-350) was fed into an Ajax 17D hammer mill fitted with a 2.5/64-inch screen. The resultant flour was conveyed through a metered augering system at a rate of 1 lb/min to a 20-gallon stainless steel tank where it was slurried with 15° C. water to approximately 7% w solids concentration. The flour/water slurry was pumped to an oscillatory screen (Rotex Model 3431, 40×84") fitted with an overhead cold water spray bar and a USS 100 screen. The oversized material from the screen was gravity-fed to a 230-gallon stainless steel, jacketed extractor fitted with a propeller agitator. Sufficient water was added to maintain 3% w solids concentration. Temperature was maintained at 60° C. and pH was maintained continuously at 10 by feedback-controlled addition of 20% w sodium carbonate solution. The net flow rate was adjusted so that average residence time of the extraction mass was 1 hour. Extraction mass exiting the vessel was pumped to a decanter centrifuge (Bird HP200) in order to remove solids. Supernatant fluid from the centrifuge was discharged to another 230-gallon stainless steel jacketed vessel equipped with propeller agitation. Temperature in this vessel was maintained at 85° C. and pH was continuously maintained at 7 by feedback-controlled addition of 20% HCl. An amylolytic enzyme was also added (Spezyme Delta AA ex Genencor) at a rate of 10 ml/min. The net flow rate was adjusted so that average residence time of the supernatant was 30 minutes. Material exiting the vessel was conveyed through the shell side of a stainless steel shell-and-tube heat exchanger and was thereby cooled to less than 30° C. The cooled fluid was pumped to an agitated stainless steel 175-gal. vessel where pH was maintained at 4 by feedback-controlled addition of HCl. The fluid was gravity-fed through a disk centrifuge (Westfalia SAMN 5036) in order to remove precipitated solids. The intermediate solution exiting from the centrifuge had a characteristic greenish translucent color.

The intermediate solution was pumped to a 220-gallon stainless steel vessel feeding an ultrafiltration unit (U.S. Filter Membralox ceramic filtration unit with P19-40, 0.2 μm ceramic elements). Fresh water was added to the vessel at a rate sufficient to offset the loss rate of permeate. The contents of the vessel were maintained at 90° C. through heat exchange with the ultrafiltration unit. Retentate, containing dissolved beta-glucan, was bled off from the ultrafiltration unit and transferred to a 60-gallon stainless steel surge vessel, then gravity-fed to a double-drum dryer (Drum Dryer & Flaker Corp. Model 28, 18×36" chrome-plated drums). The dried product was subsequently milled, yielding a beige-colored, fine powder. The beta-glucan concentration of this final product was determined to be 66.0%. The average molecular weight of the final product was determined to be about 720,000 by size exclusion high performance liquid chromatography (HPLC) using a Shodex KB-805 column.

EXAMPLE 5

Formation of Beta-glucan "Skin" During Continuous Flow Ultrafiltration

The general steps described in the previous example were followed. It was noted that a thin, colorless, translucent surface skin readily formed in the surge vessel feeding the drum dryer. The water in this vessel was evaporating because of the residual heat contained in the fluid and the fact that the top of the vessel was uncovered. Because the vessel was not equipped with agitation, the surface was quiescent, which may have further facilitated formation of the skin. When a sample of this skin was analyzed, it was found to contain 87.6% w beta-glucan. When the skin was removed from the surface of the vessel, another layer of skin formed within a few minutes. In contrast, the solids dissolved in the solution underneath the surface film contained 40.1 % w beta-glucan.

EXAMPLE 6

Effect of Heating Beta-glucan to Near the Boiling Point

To determine the effect of the heating step in producing the beta-glucan intermediate solution, three procedures were performed following the alkaline extraction/centrifugation step (FIG. 1). All routes employed the same initial steps: cold slurrying/screening to remove starch fines, followed by alkaline extraction (sodium carbonate, pH 10, 60° C., 1.5 hour) and removal of solids by centrifugation (FIG. 1).

Cool→acidify→centrifuge  Route 1:

This route involves cooling to ambient temperature, followed by acidification with HCl to the isoelectric point (pH 4) and subsequent removal of precipitated solids by centrifugation. This is the conventional route described in the literature and, typically, precedes beta-glucan precipitation in alcohol.

Acidify→heat (85° C., 30 min.)→cool→centrifuge Route 2:

Neutralize (pH 7, 70° C.)→heat (85° C., 30 min.)→cool→acidify→centrifuge  Route 3:

The results are shown in Table 1. The data in Table 1 represent the average of two identical experiments which produced very similar results.

TABLE 1

|  | Route 1 | Route 2 | Route 3 |
|---|---|---|---|
| Centrifuge pellet weight (dried), g | 0.26 | 2.16 | 1.88 |
| Beta-glucan in dried supernatant, % w | 22.7 | 39.5 | 31.5 |
| Total solids in supernatant, % w | 1.02 | 0.78 | 0.91 |

As shown in Table 1, routes 2 and 3, which involve a heating step, remove far more contaminants when combined with isoelectric precipitation than the conventional route (route 1), comprising isoelectric precipitation only. In fact, the pellet weights resulting from routes 2 and 3 are seven to eight times greater. This is underscored by the significantly higher beta-glucan concentrations resulting from routes 2 and 3 (74% and 39% higher, respectively). The total dissolved solids found in the supernatants are also consistent with these findings, with the lowest remnant solids corresponding to the highest beta-glucan concentration and vice-versa.

Because of the higher beta-glucan concentration in the supernatant, route 2 appears preferable to route 3. In addition, the centrifuge pellet from route 2 was firm, whereas the pellet from route 3 was soft. A soft pellet generally indicates more difficult solids separation in a setting in which industrial, rather than laboratory, centrifuges are used. Nonetheless, both routes 2 and 3 show considerable utility compared to the conventional route. Although these routes both employ a post-extraction heating step, acidification is performed during heating for route 2 and post-heating for route 3.

EXAMPLE 7

Beta-glucan Skin Formation Parameter Studies

Intermediate solution was prepared as described in FIG. 1. Upon analysis, the total dissolved solids in this material were determined to be 0.41% w. These solids comprised dissolved beta-glucan (45.1% w), as well as other dissolved contaminants including protein, starch and inorganic salts. An aliquot of this material (217.6 g) in a shallow glass bowl (11 cm in diameter) was placed in a convection oven operating at 89° C. The sample was removed from the oven once a surface skin had formed (within about 30 minutes). It was determined that the total dissolved solids had increased to only 0.45% w.

On the other hand, dried beta-glucan concentrate prepared by the process of the present invention can be dissolved in water to form a highly viscous solution containing a maximum of about 1.7% w beta-glucan. The maximum concentration will most likely depend upon molecular weight, and the instant process typically produces beta-glucan having an average molecular weight of between about 400,000 and one million daltons. Presumably, such a solution is at or near the saturation concentration of beta-glucan. Thus, the beta-glucan skin was formed from solution at a concentration well below the saturation level. In fact, the beta-glucan concentration in this instance was only about 0.2% w, or about 12% of saturation. However, the foregoing does not exclude the possibility of highly localized saturation or supersaturation conditions.

The possibility of beta-glucan skin formation occurring via a chemical reaction was also considered. Specifically, acidification associated with isoelectric precipitation could promote formation of a surface skin by modifying terminal glucose units. To test this, intermediate solution was prepared having an initial pH of 4.3. A portion of this material was adjusted to approximately neutral pH (7.1) using sodium carbonate. Samples of each material (pH 4.3 and pH 7.1) were placed in an 89° C. convection oven for about one hour, within which time the characteristic beta-glucan skin had formed on the surface of the remaining liquid in each container. Accordingly, a pH-driven chemical reaction does not appear to play a role in surface skin formation.

EXAMPLE 8

Multiple Harvests of Beta-glucan Skin

Intermediate solution was prepared substantially as described in Example 1. An aliquot of this solution weighing 1,108 g was placed in a glass bowl, 21 cm in diameter and 9.5 cm high. Initially, the solution contained 0.63% solids by weight; the beta-glucan concentration of these solids was 49.5% by weight. The bowl was placed on a laboratory hot plate and the solution was brought rapidly to a boil. An initial solid surface skin formed prior to boiling and was harvested. While maintaining the solution at the boiling point, a series of skins was harvested at intervals of about five minutes over a 3 hour period. Each successive skin appeared within about two minutes subsequent to each harvest. After about 1.8 hours, the rate of skin formation slowed as the remaining solution became increasingly briny. Accordingly, 400 ml of fresh water was added, resulting in restoration of the previous rapid rate of film regeneration. Surface skins were collected until about 100 ml of solution remained; however, additional skins may also be collected if desired. All of the harvested skins were combined and analyzed. The beta-glucan content was determined to be 62.7% by weight, corresponding to an overall beta-glucan recovery of 63.3% from the initial solution. It is contemplated that higher beta-glucan concentration and recovery may be achieved by water washing the skins and returning the washwater to the heated vessel. It is also contemplated that a larger evaporation area will substantially increase the rate of recovery.

It should be noted that the present invention is not limited to only those embodiments described in the Detailed Description. Any embodiment that retains the spirit of the present invention should be considered to be within its scope. However, the invention is only limited by the scope of the following claims.

What is claimed is:

1. A method for concentrating beta-glucan from a beta-glucan source, comprising the steps of:

(a) providing an alkaline aqueous extract of said beta-glucan source;

(b) acidifying or neutralizing said extract and heating said extract to between about 600° C. and 1000° C.;

(c) cooling said extract, whereby a flocculate is formed;

(d) acidifying said cooled extract if said extract was neutralized in step (b); and (e) removing said flocculate from said extract to form a beta-glucan-containing solution.

2. The method of claim 1, further comprising the step of heating said beta-glucan containing solution to allow evaporation therefrom, whereby a solid film enriched in beta-glucan is formed on the surface of said solution.

3. The method of claim 2, further comprising the step of removing said beta-glucan film, resulting in formation of a second beta-glucan film.

4. The method of claim 3, wherein said beta-glucan film removing step is performed one or more times.

5. The method of claim 2, further comprising drying said beta-glucan film.

6. The method of claim 4, further comprising the step of subjecting said beta-glucan containing solution to ultrafiltration before or after removal of said beta-glucan film.

7. The method of claim 6, wherein said ultrafiltration step removes salts and other contaminants from said beta-glucan containing solution.

* * * * *

UNITED STATES PATENT AND TRADEMARK OFFICE
CERTIFICATE OF CORRECTION

PATENT NO. : 6,624,300 B2
DATED : September 23, 2003
INVENTOR(S) : Potter et al.

It is certified that error appears in the above-identified patent and that said Letters Patent is hereby corrected as shown below:

<u>Column 14,</u>
Line 34, cancel "600" and replace it with -- 60 --.

Signed and Sealed this

Twenty-fourth Day of February, 2004

JON W. DUDAS
*Acting Director of the United States Patent and Trademark Office*